(12) United States Patent
Yang et al.

(10) Patent No.: US 12,526,814 B2
(45) Date of Patent: Jan. 13, 2026

(54) METHOD AND APPARATUS FOR TRANSMITTING/RECEIVING WIRELESS SIGNAL IN WIRELESS COMMUNICATION SYSTEM

(71) Applicant: LG Electronics Inc., Seoul (KR)

(72) Inventors: Suckchel Yang, Seoul (KR); Seonwook Kim, Seoul (KR); Seunghwan Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 535 days.

(21) Appl. No.: 17/919,928

(22) PCT Filed: May 14, 2021

(86) PCT No.: PCT/KR2021/006056
§ 371 (c)(1),
(2) Date: Oct. 19, 2022

(87) PCT Pub. No.: WO2021/230699
PCT Pub. Date: Nov. 18, 2021

(65) Prior Publication Data
US 2023/0164801 A1  May 25, 2023

Related U.S. Application Data

(60) Provisional application No. 63/062,407, filed on Aug. 6, 2020.

(30) Foreign Application Priority Data

May 14, 2020  (KR) .................. 10-2020-0057924

(51) Int. Cl.
*H04W 72/23* (2023.01)
*H04L 5/00* (2006.01)
(Continued)

(52) U.S. Cl.
CPC ......... *H04W 72/232* (2023.01); *H04L 5/0051* (2013.01); *H04W 72/0446* (2013.01)

(58) Field of Classification Search
CPC ... H04W 72/1273; H04W 48/12; H04W 8/24; H04W 72/23; H04L 12/189; H04L 5/0094; H04L 1/1861
(Continued)

(56) References Cited

U.S. PATENT DOCUMENTS

2013/0188505 A1* 7/2013 Nory .................. H04L 5/0053
370/312
2016/0192333 A1* 6/2016 Wang ................. H04L 5/0053
370/329
(Continued)

FOREIGN PATENT DOCUMENTS

KR         101709511         2/2017
KR         20180134760       12/2018

OTHER PUBLICATIONS

International Search Report in International Appln. No. PCT/KR2021/006056, dated Aug. 27, 2021, 7 pages (with English translation).

*Primary Examiner* — Marcus Smith
*Assistant Examiner* — Jason A Harley
(74) *Attorney, Agent, or Firm* — Fish & Richardson P.C.

(57) ABSTRACT

The present disclosure relates to a wireless communication system and, particularly, to a method and an apparatus therefor, the method comprising the steps of: receiving CORESET configuration information; monitoring a plurality of PDCCH candidates inside a CORESET on the basis of the CORESET configuration information; and detecting a PDCCH from among the plurality of PDCCH candidates, wherein each PDCCH candidate includes one or more
(Continued)

CCEs, each CCE includes a plurality of REGs, and one REG is defined by N(>1) continuous OFDM symbols and M(>1) continuous REs.

11 Claims, 23 Drawing Sheets

(51) Int. Cl.
*H04W 72/04* (2023.01)
*H04W 72/0446* (2023.01)
*H04W 72/1273* (2023.01)
*H04W 72/232* (2023.01)

(58) Field of Classification Search
USPC .......................................................... 370/330
See application file for complete search history.

(56) References Cited

U.S. PATENT DOCUMENTS

| | | |
|---|---|---|
| 2018/0098308 A1 | 4/2018 | Sun et al. |
| 2018/0227156 A1* | 8/2018 | Papasakellariou ........................... H04L 27/2613 |
| 2018/0279327 A1* | 9/2018 | Ying ................. H04W 72/0446 |
| 2018/0287747 A1 | 10/2018 | Lee |
| 2018/0368116 A1* | 12/2018 | Liao ...................... H04L 5/0048 |
| 2019/0132180 A1 | 5/2019 | Hosseini |
| 2019/0230689 A1* | 7/2019 | Cao .................... H04L 27/2602 |
| 2022/0104187 A1* | 3/2022 | Zhou ................. H04W 72/0446 |

* cited by examiner

Non - interleaved CCE - to - REG mapping

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2021/006056, filed on May 14, 2021, which claims the benefit of U.S. Provisional Application No. 63/062,407, filed on Aug. 6, 2020, and Korean Application No. 10-2020-0057924, filed on May 14, 2020. The disclosures of the prior applications are incorporated by reference in their entirety.

TECHNICAL FIELD

The present disclosure relates to a wireless communication system, and more particularly, to a method and apparatus for transmitting/receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

SUMMARY

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

According to a first aspect of the present disclosure, there is provided a method of receiving a signal by a user equipment (UE) in a wireless communication system. The method may include: receiving control resource set (CORESET) configuration information; monitoring a plurality of physical downlink control channel (PDCCH) candidates in a CORESET based on the CORESET configuration information; and detecting a PDCCH from among the plurality of PDCCH candidates. Each PDCCH candidate may consist of one or more control channel elements (CCEs), each CCE may consist of a plurality of resource element groups (REGs), and one REG may be defined by N consecutive orthogonal frequency division multiplexing (OFDM) symbols (where N>1) and M consecutive resource elements (REs) (where M>1).

According to a second aspect of the present disclosure, there is provided a UE for use in a wireless communication system. The UE may include: at least one radio frequency (RF) unit; at least one processor; and at least one computer memory operably coupled to the at least one processor and configured to, when executed, cause the at least one processor to perform operations. The operations may include: receiving CORESET configuration information; monitoring a plurality of PDCCH candidates in a CORESET based on the CORESET configuration information; and detecting a PDCCH from among the plurality of PDCCH candidates. Each PDCCH candidate may consist of one or more CCEs, each CCE may consist of a plurality of REGs, and one REG may be defined by N consecutive OFDM symbols (where N>1) and M consecutive REs (where M>1).

According to a third aspect of the present disclosure, there is provided an apparatus for a UE. The apparatus may include: at least one processor; and at least one computer memory operably coupled to the at least one processor and configured to, when executed, cause the at least one processor to perform operations. The operations may include: receiving CORESET configuration information; monitoring a plurality of PDCCH candidates in a CORESET based on the CORESET configuration information; and detecting a PDCCH from among the plurality of PDCCH candidates. Each PDCCH candidate may consist of one or more CCEs, each CCE may consist of a plurality of REGs, and one REG may be defined by N consecutive OFDM symbols (where N>1) and M consecutive REs (where M>1).

According to a fourth aspect of the present disclosure, there is provided a computer-readable storage medium including at least one computer program configured to, when executed, cause at least one processor to perform operations. The operations may include: receiving CORESET configuration information; monitoring a plurality of PDCCH candidates in a CORESET based on the CORESET configuration information; and detecting a PDCCH from among the plurality of PDCCH candidates. Each PDCCH candidate may consist of one or more CCEs, each CCE may consist of a plurality of REGs, and one REG may be defined by N consecutive OFDM symbols (where N>1) and M consecutive REs (where M>1).

According to a fifth aspect of the present disclosure, there is provided a method of transmitting a signal by a base station in a wireless communication system. The method may include: transmitting CORESET configuration information; configuring a plurality of PDCCH candidates in a CORESET based on the CORESET configuration information; and transmitting a PDCCH among the plurality of PDCCH candidates. Each PDCCH candidate may consist of one or more CCEs, each CCE may consist of a plurality of REGs, and one REG may be defined by N consecutive OFDM symbols (where N>1) and M consecutive REs (where M>1).

According to a sixth aspect of the present disclosure, there is provided a base station for use in a wireless communication system. The base station may include: at least one RF unit; at least one processor; and at least one computer memory operably coupled to the at least one processor and configured to, when executed, cause the at least one processor to perform operations. The operations may include: transmitting CORESET configuration information; configuring a plurality of PDCCH candidates in a CORESET based on the CORESET configuration information; and transmitting a PDCCH among the plurality of PDCCH candidates. Each PDCCH candidate may consist of one or more CCEs, each CCE may consist of a plurality of REGs, and one REG may be defined by N consecutive OFDM symbols (where N>1) and M consecutive REs (where M>1).

Preferably, each REG may include a demodulation reference signal (DMRS) only in REs of a first OFDM symbol among the N consecutive OFDM symbols.

Preferably, each REG may consist of a plurality of REs defined by the N consecutive OFDM symbols and one resource block (RB), and each CCE may consist of 6 REGs.

Preferably, each REG may consist of the N consecutive OFDM symbols and 12/N consecutive REs, and each CCE may consist of 6 REGs.

Preferably, data may be transmitted or received in a plurality of consecutive OFDM symbols (OSs) in a slot based on resource allocation information in the PDCCH. The resource allocation information may include: (i) an integer S greater than or equal to 0 defined at an OS level; and (ii) an integer L greater than or equal to 1 defined at the OS level. An index of a starting OS among the plurality of consecutive OSs may be determined as S, and a number of the plurality of consecutive OSs may be determined as N*L.

According to the present disclosure, wireless signal transmission and reception may be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
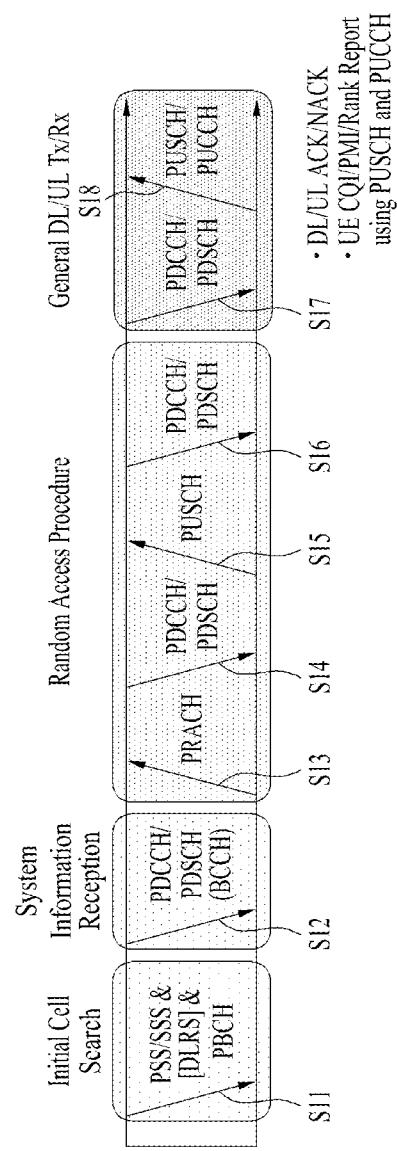
FIG. 1 illustrates physical channels used in a 3rd generation partnership project (3GPP) system, which is an example of wireless communication systems, and a general signal transmission method using the same.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
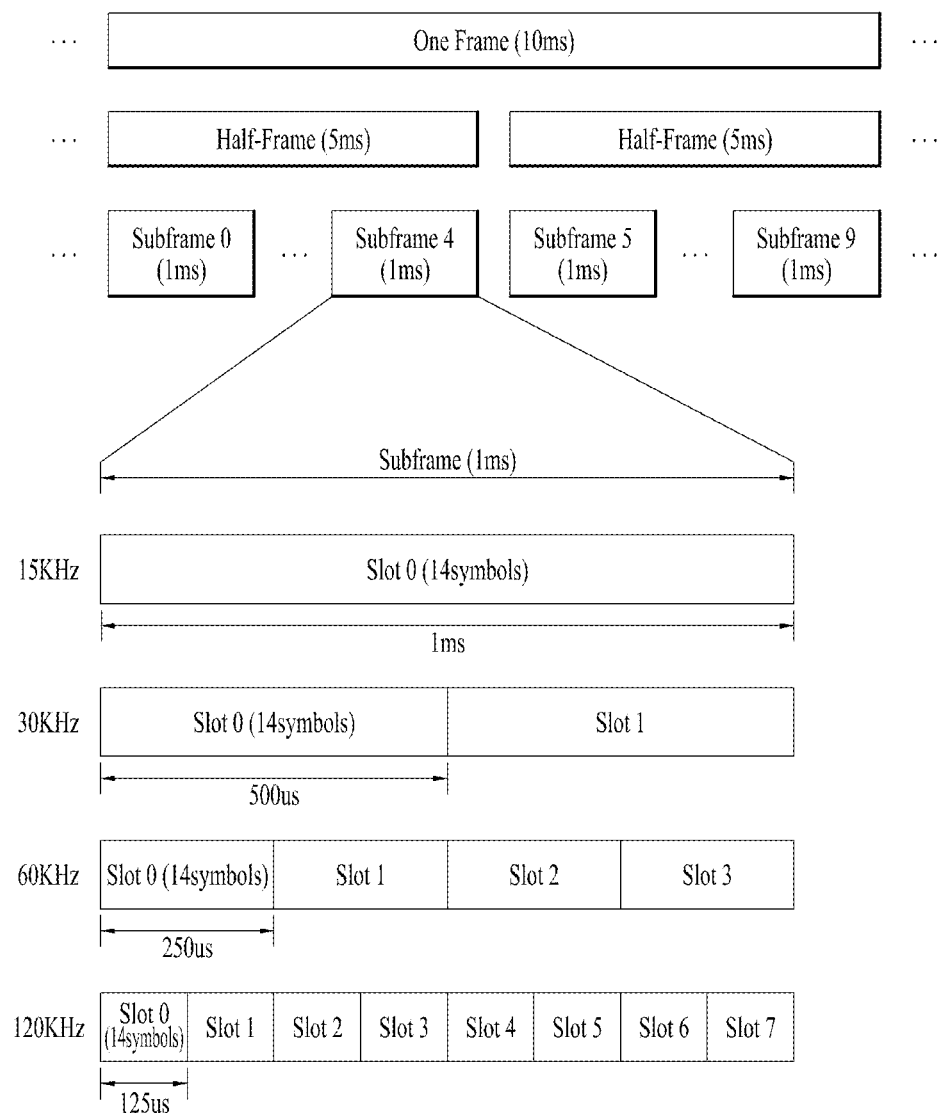
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | Nslotsymb | Nframe, uslot | Nsubframe, uslot |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Nslotsymb: Number of symbols in a slot
Nframe, uslot: Number of slots in a frame
Nsubframe, uslot: Number of slots in a subframe Table 2 illustrates that the number of symbols per slot, the number of slots per frame, and the number of slots per subframe vary according to the SCS when the extended CP is used.

TABLE 2

| SCS ($15*2^u$) | Nslotsymb | Nframe, uslot | Nsubframe, uslot |
|---|---|---|---|
| 60 kHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
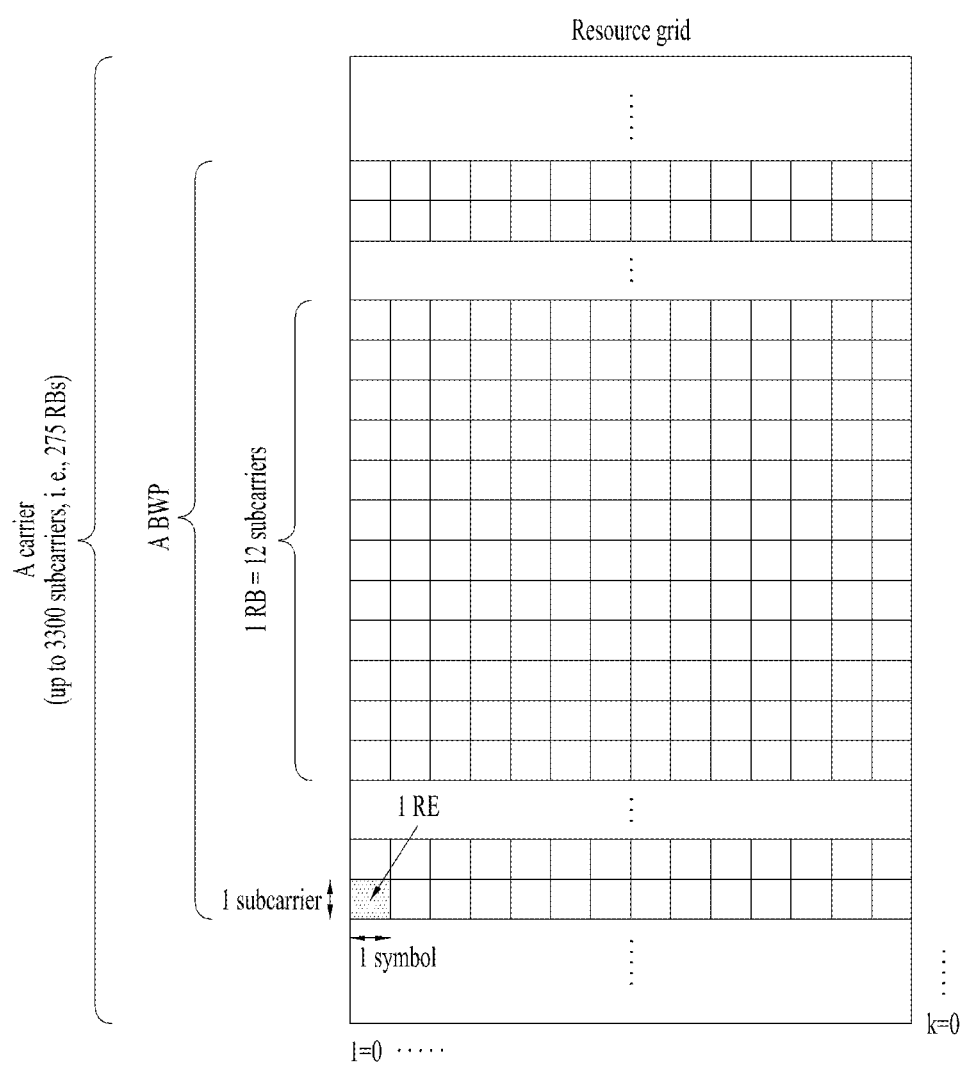
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
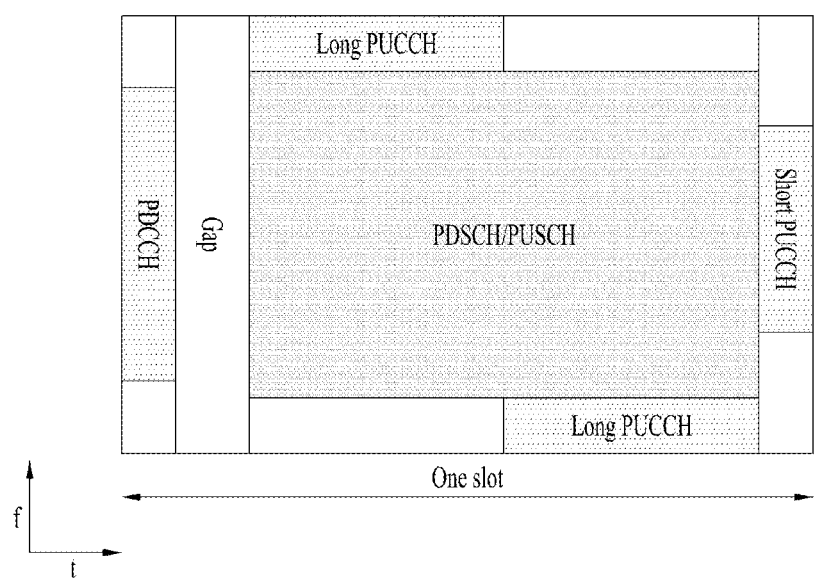
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
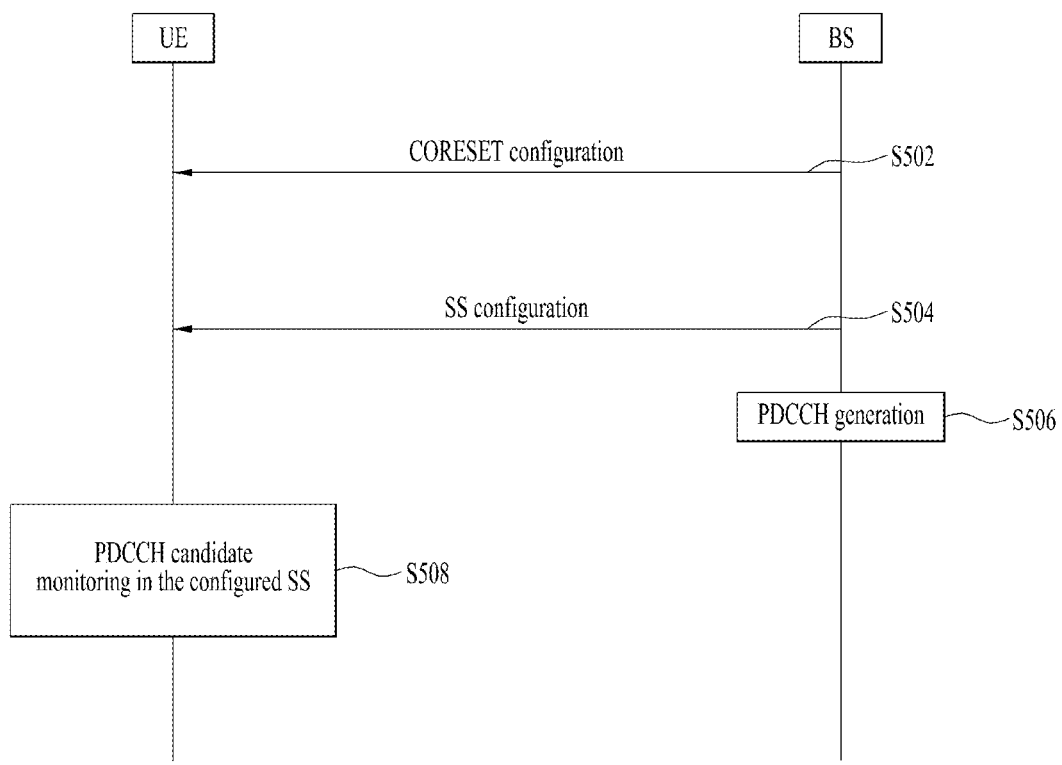
FIG. 5 is a diagram illustrating a signal flow for a physical downlink control channel (PDCCH) transmission and reception process.

FIG. 5 is a diagram illustrating a signal flow for a PDCCH transmission and reception process.

Referring to FIG. 5, a BS may transmit a control resource set (CORESET) configuration to a UE (S502). A CORESET is defined as a set of resource element groups (REGs) having a given numerology (e.g., an SCS, a CP length, and so on). An REG is defined as one OFDM symbol by one (P)RB. A plurality of CORESETs for one UE may overlap with each other in the time/frequency domain. A CORESET may be configured by system information (e.g., a master information block (MIB)) or UE-specific higher-layer signaling (e.g., radio resource control (RRC) signaling). The UE-specific RRC signaling may include, for example, an RRC setup message, BWP configuration information, and so on.

controlResourceSetId: indicates the ID of a CORESET.

frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.

duration: indicates the time resources of the CORESET. Duration indicates the number of consecutive OFDM symbols included in the CORESET. Duration has a value of 1 to 3.

cce-REG-MappingType: indicates a control channel element (CCE)-REG mapping type. Interleaved and non-interleaved types are supported.

interleaverSize: indicates an interleaver size.

pdcch-DMRS-ScramblingID: indicates a value used for PDCCH DMRS initialization. When pdcch-DMRS-ScramblingID is not included, the physical cell ID of a serving cell is used.

precoderGranularity: indicates a precoder granularity in the frequency domain.

reg-BundleSize: indicates an REG bundle size.

tci-PresentInDCI: indicates whether a transmission configuration index (TCI) field is included in DL-related DCI.

tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.

controlResourceSetId: indicates a CORESET associated with the SS.

monitoringSlotPeriodicityAndOffset: indicates a periodicity (in slots) and offset (in slots) for PDCCH monitoring.

monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: indicates the number of PDCCH candidates (one of values 0, 1, 2, 3, 4, 5, 6, and 8) for each AL where AL={1, 2, 4, 8, 16}.

searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot. Table 3 shows the characteristics of each SS.

TABLE 3

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is set to one of an interleaved type and a non-interleaved type.

Non-interleaved CCE-to-REG mapping (or localized CCE-to-REG mapping) (FIG. 5): 6 REGs for a given CCE are grouped into one REG bundle, and all of the REGs for the given CCE are contiguous. One REG bundle corresponds to one CCE.

Figure 6:
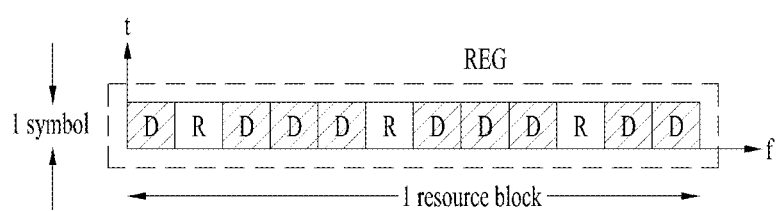
FIG. 6 illustrates a resource element group (REG) structure.

Interleaved CCE-to-REG mapping (or distributed CCE-to-REG mapping) (FIG. 6): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Equation 1 represents the resources constituting an SS. Specifically, for SS set s associated with CORESET p, CCE indexes for aggregation level L corresponding to PDCCH candidate $m_{s,n_{CI}}$ of the SS in slot $n^{\mu}_{s,f}$ of the active DL BWP of the serving cell (the value of the CI field, $n_{CI}$) may be given as follows.

$$L \cdot \left\{ \left( Y_{p,n^{\mu}_{s,f}} + \left\lfloor \frac{m_{s,n_{CI}} \cdot N_{CCE,p}}{L \cdot M^{(L)}_{s,max}} \right\rfloor + n_{CI} \right) \mod \lfloor N_{CCE,p}/L \rfloor \right\} + i,$$ [Equation 1]

where:
For the CSS, $$Y_{p,n^{\mu}_{s,f}} = 0;$$

For the USS, $$Y_{p,n^{\mu}_{s,f}} = \left( A_p \cdot Y_{p,n^{\mu}_{s,f}-1} \right) \mod D, Y_{p,-1} = n_{RNTI} \neq 0, A_p = 39827$$

for p mod 3=0, $A_p$=39829 for p mod 3=1, $A_p$=39839 for p mod 3=2, and D=65537;

i=0, . . . , L−1;

$N_{CCE,p}$ denotes the number of CCEs in CORESET p (0~$N_{CCE,p-1}$);

$n_{CI}$ indicates the CI value of a scheduled cell, and $n_{CI}$=0 when the PDCCH candidate in the CSS includes the CI field;

$m_{s,n_{CI}}$=0, . . . , $M^{(L)}_{s,n_{CI}}$−1, where $M^{(L)}_{s,n_{CI}}$−1 denotes the number of PDCCH candidates configured to be monitored by the UE for aggregation level L in SS set s for the serving cell corresponding to $n_{CI}$;

For the CSS, $M^{(L)}_{s,max}=M^{(L)}_{s,0}$;

For the USS, $M^{(L)}_{s,max}$ denotes the maximum value of $M^{(L)}_{s,n_{CI}}$ for all values of $n_{CI}$ configured for aggregation level L in SS set s, RNTI indicates C-RNTI.

NR may support a wider uplink/downlink bandwidth by aggregating multiple uplink/downlink carriers (i.e., carrier aggregation). A signal may be transmitted/received on multiple carriers by carrier aggregation. When carrier aggregation is applied, each of the carriers (refer to FIG. 3) may be referred to as a component carrier (CC). CCs may or may not be contiguous in the frequency domain. The bandwidth of each CC may be independently determined. In asymmetric carrier aggregation, the number of UL CCs may be different from the number of DL CCs. In NR, radio resources are divided into/managed as cells. A cell may consist of one DL CC and 0 to 2 UL CCs. For example, a cell may consist of (i) only one DL CC, (ii) one DC CC and one UL CC, or (ii) one DL CC and two UL CCs (including one supplementary UL CC). Cells are divided as follows. In the present disclosure, a cell may be interpreted according to a context, and may represent, for example, a serving cell. Unless otherwise stated, the operations of the present disclosure may be applied to each serving cell.

Primary Cell (PCell): A cell operating at a primary frequency (e.g., primary component carrier (PCC)) at which a UE for which carrier aggregation is configured performs an initial connection establishment procedure or initiates a connection re-establishment procedure. In the case of dual connectivity (DC), a master cell group (MCG) cell operating at a primary frequency at which the UE performs an initial connection establishment procedure or initiates a connection re-establishment procedure.

Secondary Cell (SCell): A cell that provides additional radio resources, other than a special cell for a UE for which carrier aggregation is configured.

Primary SCG Cell (PSCell): A secondary cell group (SCG) cell in which the UE performs random access when performing an RRC reconfiguration and synchronization procedure in the case of DC.

Special Cell (SpCell): In the case of DC, the SpCell represents the PCell of the MCG or the PSCell of the SCG. In the other case (i.e., the case of non-DC), the special cell represents a PCell.

Serving Cell (ServCell): Represents a cell configured for a UE in an RRC_CONNECTED state. When CA/DC is not configured, only one serving cell (i.e., PCell) exists. When CA/DC is configured, the serving cell represents a cell set including the SpCell(s) and all SCells.

The control information may be configured to be transmitted/received only through an SpCell. For example, UCI may be transmitted only through a SpCell (e.g., PCell). When an SCell in which PUCCH transmission is allowed (hereinafter, PUCCH-SCell) is configured, UCI may be transmitted even through the PUCCH-SCell. As another example, the BS may allocate a scheduling cell (set) to lower the complexity of the PDCCH blinding decoding (BD) at the UE side. For PDSCH reception/PUSCH transmission, the UE may perform PDCCH detection/decoding only in the scheduling cell. In addition, the BS may transmit the PDCCH only through the scheduling cell (set). For example, data (e.g., PDSCH, PUSCH) transmitted in one cell (or active BWP within a cell) (hereinafter, a cell may be replaced with a (active) BWP within the cell) may be scheduled through a PDCCH in the cell (Self-Carrier Scheduling (SCS)). In addition, the PDCCH for downlink allocation may be transmitted in cell #0 (i.e., a scheduling cell), and the corresponding PDSCH may be transmitted in cell #2 (i.e., a scheduled cell) (Cross-Carrier Scheduling (CCS)). The scheduling cell (set) may be configured in a UE-specific, UE-group-specific or cell-specific manner. The scheduling cell includes a special cell (e.g., PCell).

For CCS, a carrier indicator field (CIF) is used. The CIF may be disabled/enabled semi-statically by UE-specific (or UE group-specific) higher-layer signaling (e.g., RRC signaling). The CIF is an x-bit field (e.g., x=3) in the PDCCH (i.e., DCI) and may be used to indicate the (serving) cell index of the scheduled cell.

CIF disabled: The CIF is not present in the PDCCH. The PDCCH in the scheduling cell allocates PDSCH/PUSCH resources in the same cell. That is, the scheduling cell is identical to the scheduled cell.

CIF enabled: The CIF is present in the PDCCH. The PDCCH in the scheduling cell may allocate PDSCH/PUSCH resources in one of a plurality of cells using the CIF. The scheduling cell may be identical to or different from the scheduled cell. A PDSCH/PUSCH means a PDSCH or a PUSCH.

Figure 8:
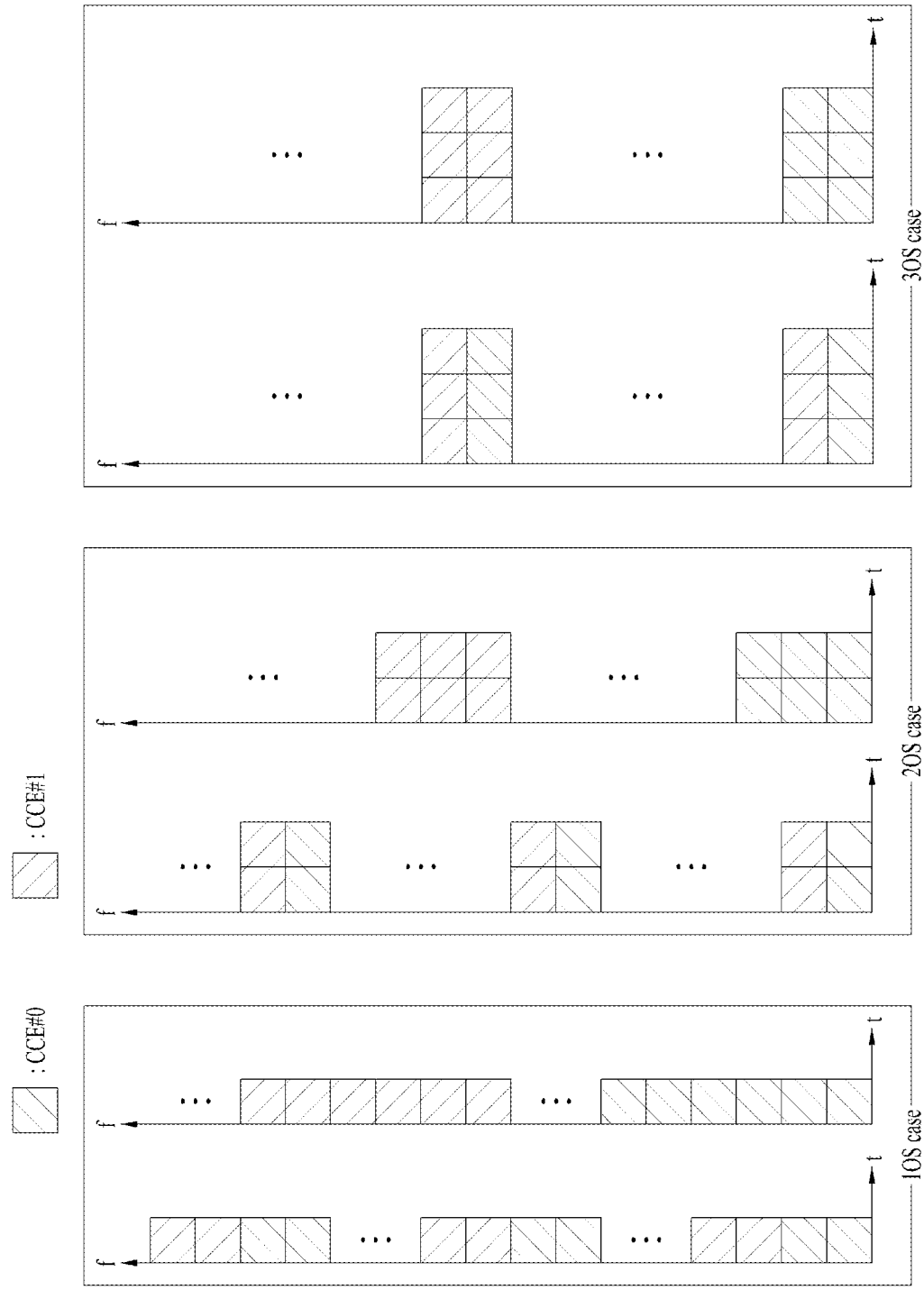
Figure 9:
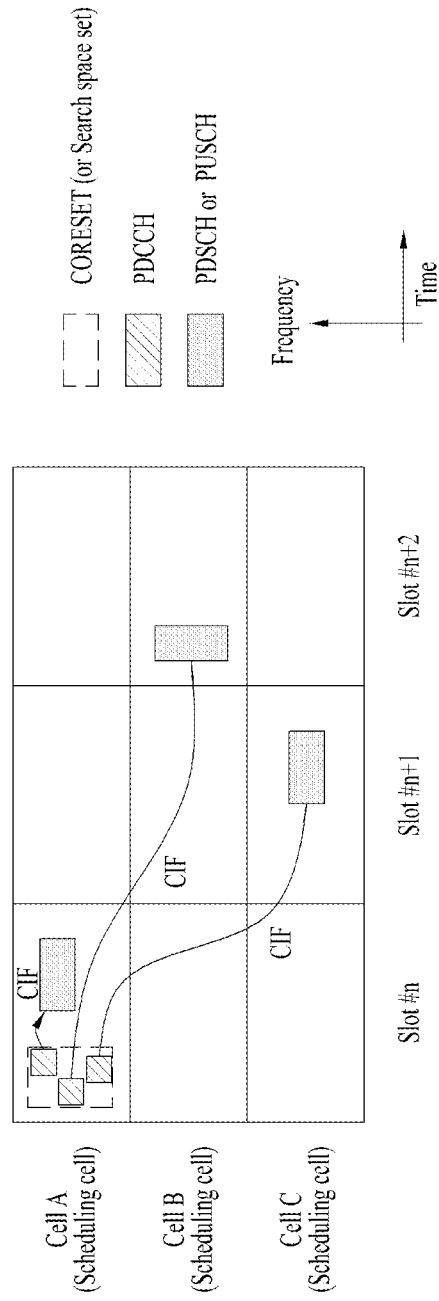
FIG. 9 illustrates a scheduling method in a multi-carrier situation.

FIG. 9 illustrates exemplary scheduling in the case of multi-cell aggregation. Referring to FIG. 8, it is assumed that three cells are aggregated. When the CIF is disabled, only a PDCCH that schedules a PDSCH/PUSCH for each cell may be transmitted in each cell (SCS). On the other hand, when the CIF is enabled by UE-specific (or UE group-specific or cell-specific) higher-layer signaling, and cell A is configured as a scheduling cell, a PDCCH that schedules a PDSCH/PUSCH in another cell (i.e., a scheduled cell) as well as a PDCCH that schedules a PDSCH/PUSCH for cell A may be transmitted in cell A (CCS). In this case, no PDCCH that schedules a PDSCH/PUSCH for cell B/C is transmitted in cell B/C.

Figure 10:
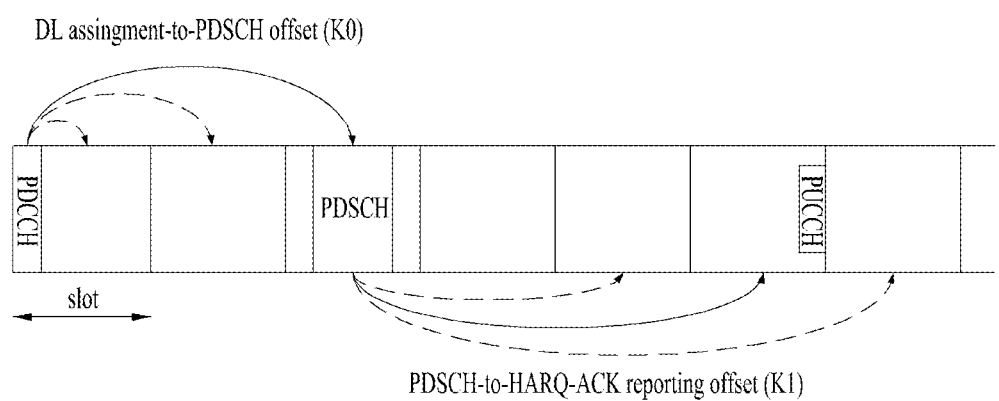
FIG. 10 illustrates an acknowledgment/negative acknowledgment (ACK/NACK) transmission process.

FIG. 10 illustrates an ACK/NACK transmission process. Referring to FIG. 10, the UE may detect a PDCCH in slot #n, where the PDCCH includes DL scheduling information (e.g., DCI formats 1_0 and 1_1), and the PDCCH indicates a DL assignment-to-PDSCH offset (K0) and a PDSCH-HARQ-ACK reporting offset (K1). For example, DCI formats 1_0 and 1_1 may include the following information.

FDRA (frequency domain resource assignment): The FDRA field indicates an RB set allocated to a PDSCH TDRA (time domain resource assignment): The TDRA field indicates K0, i.e., the starting position (e.g., OFDM symbol index) and the length (e.g., the number of OFDM symbols) of a PDSCH in a slot. The TDRA field may be indicated by a start and length indicator value (SLIV).

PDSCH-to-HARQ_feedback timing indicator: The PDSCH-to-HARQ_feedback timing indicator field indicates K1.

HARQ process number (4 bits): The HARQ process number field indicates a HARQ process identity (ID) for data (e.g., PDSCH, TB, etc.).

PUCCH resource indicator (PRI): The PRI field indicates a PUCCH resource to be used for UCI transmission among a plurality of PUCCH resources in a PUCCH resource set.

Thereafter, the UE may receive a PDSCH in slot #(n+K0) based on the scheduling information in slot #n and then transmit UCI over a PUCCH in slot #(n+K1). Here, the UCI includes a HARQ-ACK response for the PDSCH. When the PDSCH is configured to transmit a maximum of one TB, the HARQ-ACK response may be composed of one bit. When the PDSCH is configured to transmit a maximum of two TBs, the HARQ-ACK response may be composed of two bits if no spatial bundling is configured. However, if spatial bundling is configured, the HARQ-ACK response may be composed of one bit. If the HARQ-ACK transmission time for a plurality of PDSCHs is designated as slot #(n+K1), the UCI transmitted in slot #(n+K1) may include HARQ-ACK responses for the plurality of PDSCHs.

Figure 11:
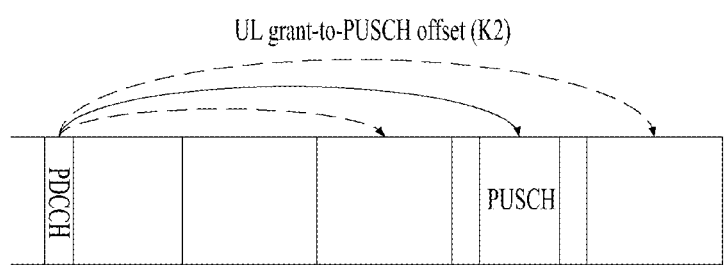
FIG. 11 illustrates a physical uplink shared channel (PUSCH) transmission process.

FIG. 11 illustrates a PUSCH transmission process. Referring to FIG. 11, the UE may detect a PDCCH in slot #n, where the PDCCH includes UL scheduling information (e.g., DCI formats 0_0 and 0_1). DCI formats 0_0 and 0_1 may include the following information.

FDRA: The FDRA field indicates an RB set allocated to a PUSCH.

TDRA: The TDRA field indicates a slot offset K2, i.e., the starting position (e.g., symbol index) and the length (e.g., the number of OFDM symbols) of a PUSCH in a slot. The starting symbol and length may be indicated by an SLIV or indicated separately.

Thereafter, the UE may transmit a PUSCH in slot #(n+K2) based on the scheduling information in slot #n, where the PUSCH includes a UL-SCH TB. When the PUCCH transmission time and the PUSCH transmission time overlap, UCI may be transmitted over the PUSCH (PUSCH piggyback).

Embodiment: OFDM Symbol Group (OSG) Based Signal Transmission and Reception

Recently, 3GPP has standardized a 5G system named New RAT (NR) (over Rel-15 and Rel-16). The NR system aims to support multiple logical networks in a single physical system. To this end, the NR system is designed to support services with various requirements (e.g., eMBB, mMTC, URLLC, etc.) by managing/changing analog/hybrid beamforming in consideration of various OFDM numerologies (e.g., OFDM symbol duration, SCS, CP length, etc.) and the features of wide operating frequency ranges (up to approximately 50 GHz) and high frequency bands.

Figure 12:
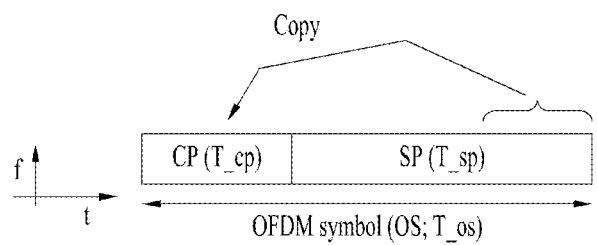
FIG. 12 illustrates an orthogonal frequency division multiplexing (OFDM) symbol (OS) structure.

FIG. 12 illustrates an OFDM symbol (OS) structure. An OS consists of a CP and a symbol part (SP). The duration of an OS is defined by CP duration+SP duration. The CP is copied from the end of the SP and is used to cancel inter-symbol interference. T_xx denotes the time length/duration (e.g., the number of samples) of XX. The SP length is inversely proportional to the SCS (see FIG. 2). Here, the OS may refer to both a CP-OFDM symbol and a DFT-s-OFDM symbol.

In recent years (for Rel-17 and later), the need to develop a NR system operating in higher frequency bands (about 60 to 70 GHz or higher) than the legacy NR system based on Rel-15/16 has emerged (such a NR system is referred to as a HF-NR system). In the HF-NR system, a new OFDM numerology based on a large SCS (e.g., 240 kHz, 480 kHz, 960 kHz, etc.) compared to the SCS of legacy NR (e.g. 15 kHz, 30 kHz, 60 kHz, 120 kHz, etc.) may be introduced and applied in consideration of the radio channel characteristics, such as higher frequency and wider bandwidth than the legacy NR system, and larger phase noise and larger Doppler shift due to high frequency bands.

In the HF-NR system, the OFDM symbol duration and slot duration decrease as the SCS increases. Thus, cell planning for operating/managing a cell by reducing the coverage of the cell may be considered. However, otherwise (when the cell coverage is maintained at a similar level to legacy NR or when the OFDM symbol duration and slot duration do not decrease as the SCS increases), coverage compensation may be required for physical channel/signal transmission. In addition, since the CP length decreases due to the use of a large SCS, it is necessary to consider the delay spread of a radio channel, phase noise impacts, and beam switching times. Accordingly, these issues may need to be taken into account for the coverage compensation.

Hereinafter, the present disclosure proposes an OSG-based physical channel/signal structure and configuration method therefor. For example, the present disclosure proposes an OSG-based physical channel/signal structure and configuration method therefor in consideration of the effect of coverage loss compensation due to a large SCS, radio channel characteristics (such as delay spread and phase noise), and beam switching operation, etc. However, the present disclosure is not limited thereto, and the OSG-based signal transmission herein may be usefully applied to the HF-NR system.

Figure 13:
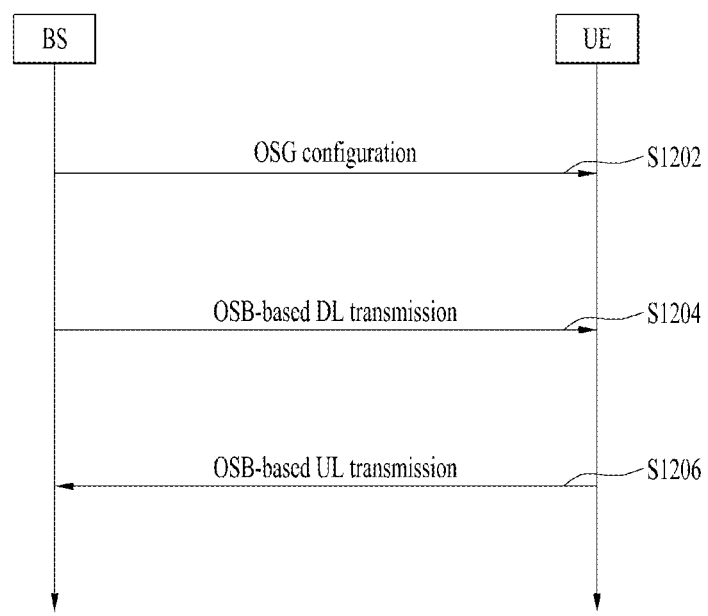
FIG. 13 illustrates an OFDM symbol group (OSG) based signal transmission process.

FIG. 13 illustrates OSG-based signal transmission. Referring to FIG. 13, the UE may receive OSG configuration information from the BS (S1202). The OSG configuration information may include various information on an OSG structure/setting/configuration. Thereafter, the UE may receive a DL signal from the BS based on the OSG (S1204). In this case, the DL signal may include a PDCCH, PDSCH, RS (e.g., CSI-RS), etc. The UE may transmit a UL signal to the BS based on the OSG (S1206). In this case, the UL signal may include a PUSCH, PUCCH, RS (e.g., SRS), etc. Hereinafter, the OSG configuration and signal transmission will be described in detail.

(1) Proposed OSG Structure and Configuration

Figure 14:
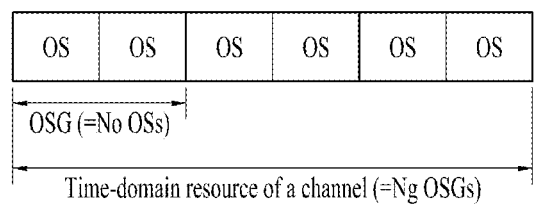
FIG. 14 illustrates an OSG structure.

FIG. 14 illustrates time-domain resource allocation based on an OSG.

Referring to FIG. 14, one OSG may be composed/configured of/with one or a plurality of OSs (consecutive in time). When the number of OSs included in one OSG (i.e., OSG size) is determined/configured, one channel may be composed/configured of/with one or a plurality of OSGs (consecutive in time). For example, when the OSG size is set to No OSs and when the number of OSGs included in the channel is set to Ng, the channel may be composed of {No×Ng} OSs. Accordingly, when time-domain resources are allocated to the channel, information/parameters on the start, duration/length, or end of the time-domain resources may be configured/indicated at the OSG level (e.g., OSG index, the number of OSGs, etc.). No may be a positive integer, preferably, an integer greater than or equal to 2. Ng may be a positive integer. When No is defined as an integer greater than or equal to 1, OSG-based transmission may integrally support the conventional OS-based channel configuration/transmission. The OSG configuration may be independently configured/set for each (physical) channel, independently configured/set for each DL or UL (physical) channel, or configured/set in common for all (physical) channels.

Additionally, one slot may also be determined/configured based on the OSG structure (to be suitable for the channel configuration and scheduling/transmission based on the OSG described above). As an example, when the OSG size is set to No OSs, one slot duration may be determined/configured as an OS set having a total of {No×14} OSs. As another example, considering the necessity/possibility of configuring/operating a plurality of different OSG sizes for each UE and/or each channel, one slot may be determined/configured as an OS set having a total of {No×14×a} OSs (where a is a positive integer). Accordingly, information/parameters on a scheduling timing and/or HARQ timing (e.g., DL/UL grant DCI-to-PDSCH/PUSCH timing or PDSCH-to-HARQ-ACK timing) applied to a specific channel may be configured/indicated at the slot level based on the OSG.

It may be considered to (i) support time-domain (e.g., slot/symbol boundary) alignment between a plurality of OFDM numerologies based on different SCSs and/or (ii) set the length of a (HF-NR) slot duration to be less than or equal to that of a (smallest) slot based on a (largest) SCS (e.g., 120 kHz) of legacy NR (Rel-15/16). Accordingly, when the SCS is 240 kHz, the value of No configurable as the OSG size may be limited to {1, 2}. When the SCS is 480 kHz, the No value configurable as the OSG size may be limited to {1, 2, 4}. When the SCS is 960 kHz, the No value configurable as the OSG size may be limited to {1, 2, 4, 8}.

A plurality of OSs included in one OSG may be set/configured such that the same (encoded) control/data signal or the same RS (sequence) signal is repeatedly mapped/transmitted (over the corresponding OSs) (i.e. the signal may be mapped at the OS level within the OSG). In this case, scrambling/sequencing parameters (e.g., scrambling seed or scrambling identifier (SCID) value, base/root sequence index, cyclic shift, OCC index, etc.) applied to the control/data/RS signals (for interference randomization, multi-UE multiplexing, etc.) may be configured/set such that the same value is applied to the plurality of OSs in the OSG. For example, a scrambling/sequencing parameter determined based on a specific (e.g., first) OS (index) in the OSG may be equally applied to the remaining OSs in the OSG (e.g., signals repeatedly transmitted/mapped over the OSs). The above-described OSG configuration/structure is referred to as "Repetition ON" for convenience.

Alternatively, a plurality of OSs included in one OSG may be set/configured such that different (encoded) control/data signals or different RS (sequence) signals are mapped/transmitted (over the corresponding OSs) (as opposed to above). In this case, scrambling/sequencing parameters (e.g., scrambling seed or SCID value, base/root sequence index, cyclic shift, OCC index, etc.) applied to the control/data/RS signals (for randomization/multiplexing, etc.) may be configured/set such that different values (determined based on each OS (index)) are applied to the plurality of OSs included in the OSG. That is, a different scrambling/sequencing parameter may be applied to each OS in the OSG. The above-described OSG configuration/structure is referred to as "Repetition OFF" for convenience. In this case, the OS (index) may indicate an OS index in the slot or an OS index in the OSG.

The OSG size (i.e., the number of OSs included in the OSG) may be configured (independently (differently) or equally) for each UE and/or each channel. Whether the configured OSG configuration/structure is based on either Repetition ON or Repetition OFF may be configured (independently (differently) or equally) for each UE and/or each channel.

(2) Proposed OSG Configuration Method

The following OSG configuration methods may be considered according to how No OSs included in one OSG are (repeatedly) mapped in the duration of the OSG (based on Repetition ON). For convenience of description, when one OSG is composed of only one OS (that is, when a channel is configured/transmitted at the OS level as in the prior art), a time corresponding to one OS, a time corresponding to one (normal) CP, and a time corresponding to one SP are defined as $T\_os$, $T\_cp$, and $T\_sp$, respectively.

Figure 15:
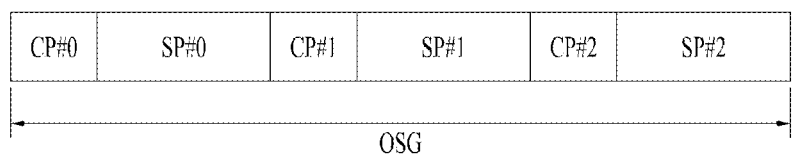
FIGS. 15 to 18 illustrate structures of OSG-based channels according to examples of the present disclosure.

1) Opt 1
   A. A structure in which {CP+SP} corresponding to one complete OS is mapped (repeatedly) such that No pieces of {CP+SP} are concatenated
      i. For example, referring to FIG. 15, one OSG may have the following structure: {CP+SP, CP+SP, . . . }.
      ii. According to this structure, multiple UEs and/or multiple channels configured with different OSG sizes may be easily multiplexed based on time-domain (e.g., slot/symbol boundary) alignment.
      iii. In addition, this structure may be applied to the OSG configuration based on Repetition OFF (as well as the OSG configuration based on Repetition ON).

Figure 16:
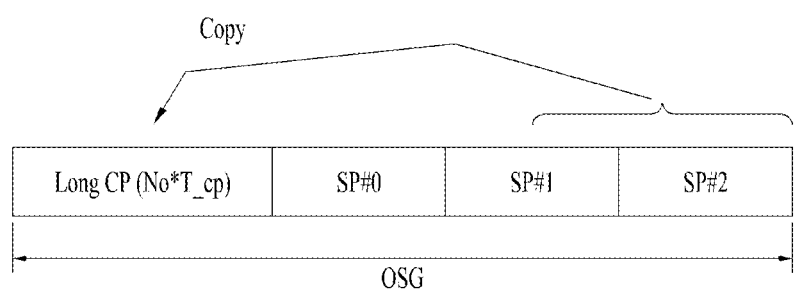

2) Opt 2
   A. A structure in which a long CP having a length of {No×T_cp} is added in front of an SP portion, where the SP portion is obtained by repeatedly mapping an SP such that No SPs are concatenated
      i. For example, as shown in FIG. 16, one OSG may have the following structure: {long CP, SP, SP, . . . }.
      ii. The long CP may be configured by copying a rear part of the SP portion as much as {No×T_cp}.
      iii. This structure may have an advantage of being robust to the delay spread impact and/or beam switching time of a radio channel due to the extension of the CP length.

Figure 17:
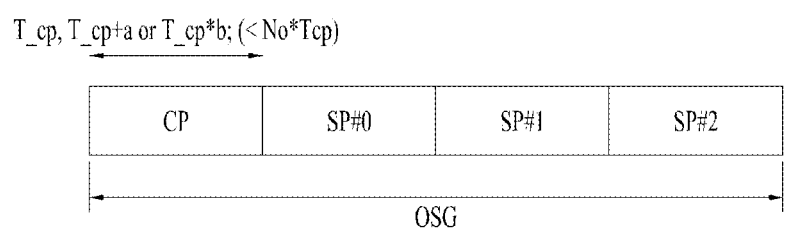

3) Opt 3
   A. A structure in which a CP having a length of T_cp, {T_cp+a}, or {T_cp×b} is added in front of an SP portion, where the SP portion is obtained by repeatedly mapping an SP such that No SPs are concatenated
      i. For example, as shown in FIG. 17, one OSG may have the following structure: {CP, SP, SP, . . . }.
      ii. In this case, the CP may be a normal CP or an extended CP, and the CP length may be set smaller than {No× T_cp} (unlike Opt 2).
      iii. This structure may have an advantage of reducing unnecessary CP overhead (while it is not easy to achieve time-domain (e.g., slot/symbol boundary) alignment).
      1. When one channel resource is configured with a plurality of OSGs according to this structure, the channel resource may be configured with consecutive OSGs from the start or end of the channel resource while the corresponding start/end is aligned with a specific symbol boundary. In this case, the time length of each OSG may be configured to be the same, and thus, the end/start of the corresponding channel may not coincide with the symbol boundary.
      2. As another method, for a specific time duration (e.g., slot, subframe or frame) or a duration consisting of a specific number (e.g., Nt) of consecutive OSG, the first OSG (start) or the last OSG (end) of the corresponding duration may be aligned with the (symbol) boundary of the corresponding duration so that a plurality of (consecutive) OSGs may be configured within the corresponding duration. For example, the first OSG (start) or the last OSG (end) may be configured to be shorter or longer than a normal OSG (e.g., OSG located in the middle) included in the corresponding channel resource by adjusting the CP length.

(3) OSG-Based Channel Configuration 1

Figure 7:
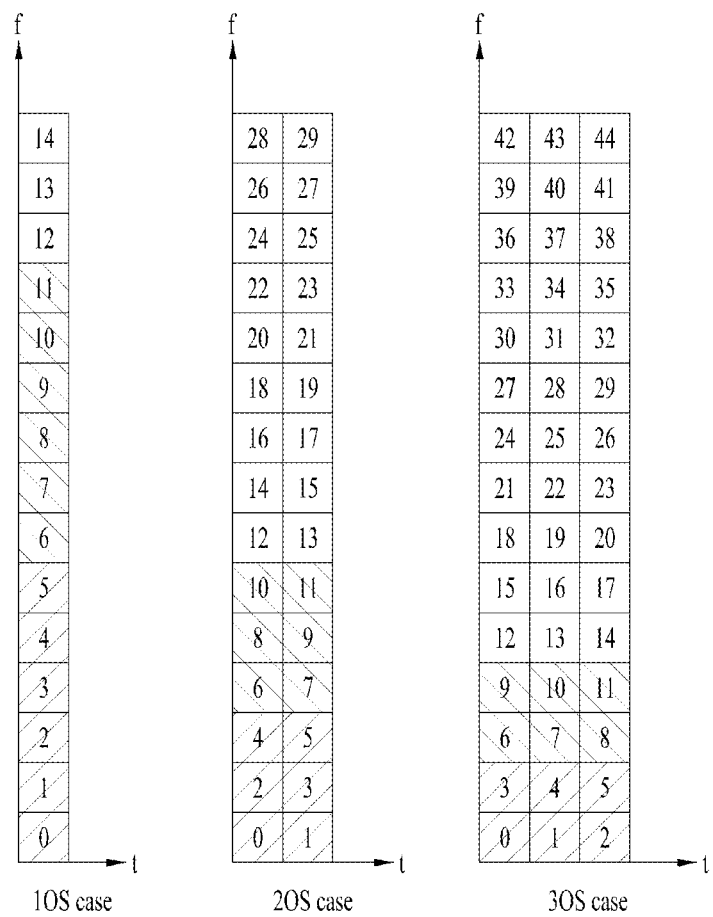
FIGS. 7 and 8 illustrate exemplary control resource set (CORESET) structures.

To configure a PDCCH, which is a DL control channel, based on the OSG, the following REG and CCE structures may be considered (for a CORESET, which is a PDCCH transmission resource region). For reference, when one OSG consists of only one OS as in the prior art (that is, when a channel is configured/transmitted at the OS level), a CORESET duration may be set to one of one, two, or three OSs (see FIGS. 7 and 8). One REG may be composed of an RE set corresponding to {1 OS×1 RB (=12 REs)} (see FIG. 6). One CCE may be composed of 6 REGs (e.g., for a plurality of REGs included in the CORESET, each CCE may be configured by bundling 6 REGs in a time first (T-first) and frequency second (F-second) manner) (see FIGS. 7 and 8).

First, if OSGs are configured in a CORESET configuration for PDCCH mapping/transmission, the number of OSGs included in one CORESET, Nc may be set to one of {1, 2, 3}. Thus, one CORESET may be composed of {No×NC} OSs in the time domain. In addition, it may be configured whether the corresponding OSG is configured/set based on either Repetition ON or Repetition OFF. Accordingly, (coded) control signal mapping and scrambling/sequencing application based on the configured method may be performed on OSs included in each OSG.

1) Opt 1
   A. The REG size is maintained as {1 OS×1 RB}, and the CCE size is maintained as 6 REGs.
      i. Each REG in the CORESET may be configured with a RE set corresponding to {1 OS, 1 RB} in the time and frequency domains. For a plurality of REGs in the CORESET configured as described above, each CCE may be configured by bundling 6 REGs in a T-first and F-second (or F-first and T-second) manner (see FIGS. 7 and 8).
      ii. According to this structure, both the number of REs included in the REG and the number of REGs included in the CCE may be maintained to be the same, regardless of the configured OSG size.
      iii. According to this structure, DMRSs for PDCCH reception may be all mapped/transmitted to/in each REG, or the DMRSs may be mapped/transmitted to/in only one specific (e.g., first) REG among No REGs (OSG size) in the time domain.

2) Opt 2
   A. The REG size is set to {1 OS×1 RB}, and the CCE size is set to {No×6} REGs.
      i. Each REG in the CORESET may be configured with a RE set corresponding to {1 OS, 1 RB}. For a plurality of REGs in the CORESET configured as described above, each CCE may be configured by bundling {No×6} REGs in a T-first and F-second (or F-first and T-second) manner (see FIGS. 7 and 8).
      ii. According to this structure, the number of REGs included in the CCE may increase proportionally to the configured OSG size.
      iii. According to this structure, DMRSs for PDCCH reception may be all mapped/transmitted to/in each REG, or the DMRSs may be mapped/transmitted to/in only one specific (e.g., first) REG among No REGs (OSG size) in the time domain.

Figure 18:
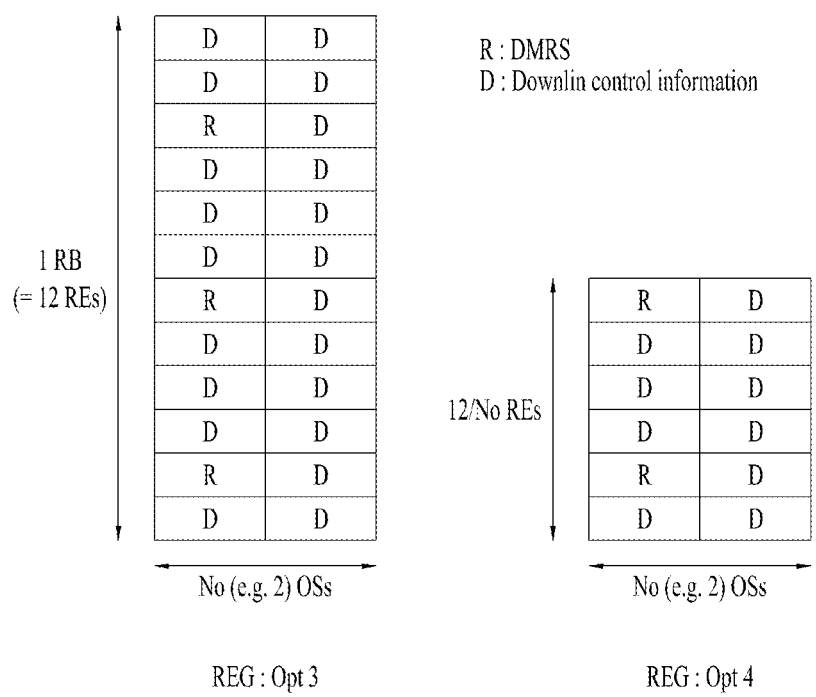

3) Opt 3
   A. The REG size is set to {No OSs×1 RB}, and the CCE size is set to 6 REGs.
      i. Each REG in the CORESET may be configured with a RE set corresponding to {No OSs, 1 RB} in the time and frequency domains as shown in FIG. 18. For a plurality of REGs in the CORESET configured as described above, each CCE may be configured by bundling 6 REGs in a T-first and F-second (or F-first and T-second) manner (see FIGS. 7 and 8).
      ii. According to this structure, the number of REs included in the REG may increase in proportion to the configured OSG size (as many as No OSs in the time domain).
      iii. According to this structure, DMRSs for PDCCH reception may be all mapped/transmitted to/in each OS, or the DMRSs may be mapped/transmitted to/in only one specific (e.g., first) OS included in each REG (in units of No OSs) in the time domain.
4) Opt 4
   A. The REG size is set to {No OSs×(12/No) REs}, and the CCE size is set to 6 REGs.
      i. Each REG in the CORESET may be configured with a RE set corresponding to {No OSs, 12/No REs} in the time and frequency domains as shown in FIG. 18. For a plurality of REGs in the CORESET configured as described above, each CCE may be configured by bundling 6 REGs in a T-first and F-second (or F-first and T-second) manner (see FIGS. 7 and 8).
      ii. According to this structure, the number of REs included in the REG may be maintained to be the same regardless of the configured OSG size (however, No OSs may be occupied in the time domain).
      iii. According to this structure, DMRSs for PDCCH reception may be all mapped/transmitted to/in each OS, or the DMRSs may be mapped/transmitted to/in only one specific (e.g., first) OS included in each REG (in units of No OSs) in the time domain.

Figure 19:
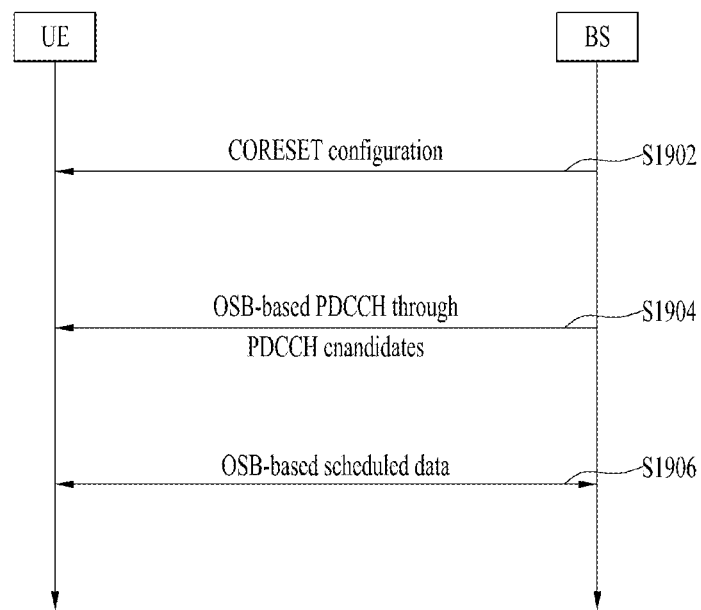
FIG. 19 illustrates a signal transmission process according to an example of the present disclosure.

FIG. 19 illustrates a signal transmission process according to an example of the present disclosure. Referring to FIG. 19, the UE may receive CORESET configuration information from the BS (S1902). Thereafter, the UE may monitor a plurality of PDCCH candidates in a CORESET based on the CORESET configuration information (S1904) and detect a PDCCH from among the plurality of PDCCH candidates (S1906). To this end, the BS may configure the plurality of PDCCH candidates based on the CORESET configuration information and transmit the PDCCH in the plurality of PDCCH candidates. In this case, each PDCCH candidate may include one or more CCEs, and each CCE may include a plurality of REGs.

In the present disclosure, PDCCH transmission may be performed based on an OSG. To this end, a CCE/REG may be configured based on the OSG. For example, the CCE/REG may be configured according to Opts 1 to 4 described above. For example, in Opts 3 and 4, one REG may be defined by N (>1) consecutive OSs and M (>1) consecutive REs. In this case, the REG may include a DMRS only in REs of the first OS among the N consecutive OSs. In addition, the CCE may be composed of 6 REGs. Also, data transmission/reception may be performed based on the OSG. For example, the data transmission/reception may be performed according to "(3) OSG-Based Channel Configuration 2" below. For example, data may be transmitted or received in a plurality of consecutive OSs in a slot, based on resource allocation information in a PDCCH. The resource allocation information may include: (i) an integer S more than or equal to 0, which is defined at the OS level; and (ii) an integer L more than or equal to 1, which is defined at the OS level. The index of a starting OS among the plurality of consecutive OSs may be determined as S, and the number of consecutive OSs may be determined as N*L (see Opt 2 of (3) OSG-Based Channel Configuration 2).

(4) OSG-Based Channel Configuration 2

Hereinafter, a method of configuring/indicating/applying PDSCH/PUSCH start/length (SLIV) information and PDSCH/PUSCH (DMRS) mapping type information for DL/UL data channel (PDSCH/PUSCH) resource allocation and signal configurations based on an OSG will be described. Herein, it is assumed that the size of the OSG is set to No OSs.

1) Opt 1
   A. The starting symbol index S and length L of a PDSCH/PUSCH may be configured/indicated at the level of the OSG index/size, that is, as a multiple of {No OSs}.
      i. S and L may be configured/indicated based on a set of OS indices {0, 1, . . . , 13} as in the prior art. In this case, the starting symbol index allocated as actual resources may be determined as {No×S}, and the length thereof may be determined as {No×L}.
         1. The same TB (or different coded bits for the same TB) may be mapped/transmitted over {No×L} symbols.
         2. For a PUCCH, the starting symbol index S and length L of a PUCCH resource may be configured/indicated in the same way as described above.
      ii. Mapping of a PDSCH/PUSCH signal including a DMRS may be performed as follows based on information on a mapping type (A or B) indicated by DCI.
         1. Opt X: L-symbol mapping (including the DMRS), which is obtained by applying the indicated mapping type to virtual resources on the assumption that the starting symbol index and length are S and L, respectively, may be concatenated/repeated No times within a duration of {No×L} OSs, which is determined as actual resources.
         2. Opt Y: A plurality of slots (one or more slots) may be included in a duration of {No×L} OSs determined as actual resources. In this case, the indicated mapping type is applied only to resources allocated to the first slot (and/or the last slot) among the corresponding slots, and one specific predefined/preconfigured mapping type may be applied to resources allocated to the remaining slots.
         3. Opt Z: (For a PUCCH (e.g., format 3/4)), a plurality of slots (one or more slots) may be included in a duration of {No×L} OSs determined as actual resources. In this case, for the time length (e.g., the number of PUCCH symbols) of resources allocated to the corresponding slots, a predefined/preconfigured DMRS symbol pattern may be applied to each slot.

2) Opt 2
   A. The starting symbol index S and length L may be configured/indicated at the OS level as in the prior art, and the length of a PDSCH/PUSCH allocated as actual resources may be determined as {No×L}.
      i. S and L may be configured/indicated based on a set of OS indices {0, 1, . . . , 13} as in the prior art. In this case, the starting symbol index allocated as actual resources may be determined as S, and the length thereof may be determined as {No×L}.
         1. The same TB (or different coded bits for the same TB) may be mapped/transmitted over {No×L} symbols.

2. For a PUCCH, the starting symbol index S and length L of a PUCCH resource may be configured/indicated in the same way as described above.

ii. Mapping of a PDSCH/PUSCH signal including a DMRS may be performed as follows based on information on a mapping type (A or B) indicated by DCI.

1. Opt X: L-symbol mapping (including the DMRS), which is obtained by applying the indicated mapping type to virtual resources on the assumption that the starting symbol index and length are S and L, respectively, may be concatenated/repeated No times within a duration of {No×L} OSs, which is determined as actual resources.

2. Opt Y: A plurality of slots (one or more slots) may be included in a duration of {No×L} OSs determined as actual resources. In this case, the indicated mapping type is applied only to resources allocated to the first slot (and/or the last slot) among the corresponding slots, and one specific predefined/preconfigured mapping type may be applied to resources allocated to the remaining slots.

3. Opt Z: (For a PUCCH (e.g., format 3/4)), a plurality of slots (one or more slots) may be included in a duration of {No×L} OSs determined as actual resources. In this case, for the time length (e.g., the number of PUCCH symbols) of resources allocated to the corresponding slots, a predefined/preconfigured DMRS symbol pattern may be applied to each slot.

3) Opt 3

A. The starting symbol index S and length L may be configured/indicated at the OS level, but the starting symbol index S and length L may be signaled/configured with respect to a set of (localized) OS indices within a duration of No slots.

i. S and L may be configured/indicated based on a set of OS indices {0, 1, . . . , (No×14)−1}. In this case, the starting symbol index and length of an actual resource may be determined as S and L, respectively.

1. The same TB (or different coded bits for the same TB) may be mapped/transmitted over L symbols.

2. For a PUCCH, the starting symbol index S and length L of a PUCCH resource may be configured/indicated in the same way as described above.

ii. Mapping of a PDSCH/PUSCH signal including a DMRS may be performed as follows based on information on a mapping type (A or B) indicated by DCI.

1. Opt Y: A plurality of slots (one or more slots) may be included in a duration of L OSs determined as actual resources. In this case, the indicated mapping type is applied only to resources allocated to the first slot (and/or the last slot) among the corresponding slots, and one specific predefined/preconfigured mapping type may be applied to resources allocated to the remaining slots.

2. Opt Z: (For a PUCCH (e.g., format 3/4)), a plurality of slots (one or more slots) may be included in a duration of L OSs determined as actual resources. In this case, for the time length (e.g., the number of PUCCH symbols) of resources allocated to the corresponding slots, a predefined/preconfigured DMRS symbol pattern may be applied to each slot.

1) Note 1

A. For Opt 1/2/3, the starting symbol index and length of an actual PDSCH/PUSCH resource may be determined with respect to a set of (localized) OS indices within a duration of No slots including slot(s) indicated by a slot offset for DCI-to-PDSCH timing, K0 and a slot offset for DCI-to-PUSCH timing, K2.

B. For a PUCCH, the starting symbol index and length of an actual PUCCH resource may be determined with respect to a set of (localized) OS indices within a duration of No slots including slot(s) indicated by a slot offset for PDSCH-to-HARQ-ACK timing, K1.

Various descriptions, functions, procedures, proposals, methods, and/or operational flow charts of the present disclosure may be applied to, but not limited to, various fields requiring wireless communication/connection (e.g., 5G) between devices.

With reference to the drawings, the present disclosure will be described in greater detail. In the following drawings/description, like reference numerals may denote the same or corresponding hardware blocks, software blocks, or functional blocks, unless otherwise specified.

According to the present disclosure, at least one memory (e.g., 104 or 204) may store instructions or programs which, when executed, cause at least one processor operably coupled to the at least one memory to perform operations according to various embodiments or implementations of the present disclosure.

According to the present disclosure, a computer-readable storage medium may store at least one instruction or computer program which, when executed by at least one processor, cause the at least one processor to perform operations according to various embodiments or implementations of the present disclosure.

According to the present disclosure, a computer program is stored in at least one computer readable (non-volatile) storage medium, and may include program code that, when executed, performs operations (by the at least one processor) according to some embodiments or implementations of the present disclosure. The computer program may be provided in the form of a computer program product. The computer program product may include at least one computer-readable (non-volatile) storage medium. The computer-readable storage medium may include program code that, when executed, performs operations (by the at least one processor) according to some embodiments or implementations of the present disclosure.

According to various embodiments of the present disclosure, a processing device or apparatus may include the at least one processor and at least one computer memory connected to the at least one processor. The at least one computer memory may store instructions or programs which, when executed, cause the at least one processor operably coupled to the at least one memory to perform operations according to various embodiments or implementations of the present disclosure.

A communication device according to the present disclosure may include at least one processor, and at least one computer memory operatively connected to the at least one processor, and configured to store instructions such that the at least one processor performs specific operations by executing the instructions.

Figure 20:
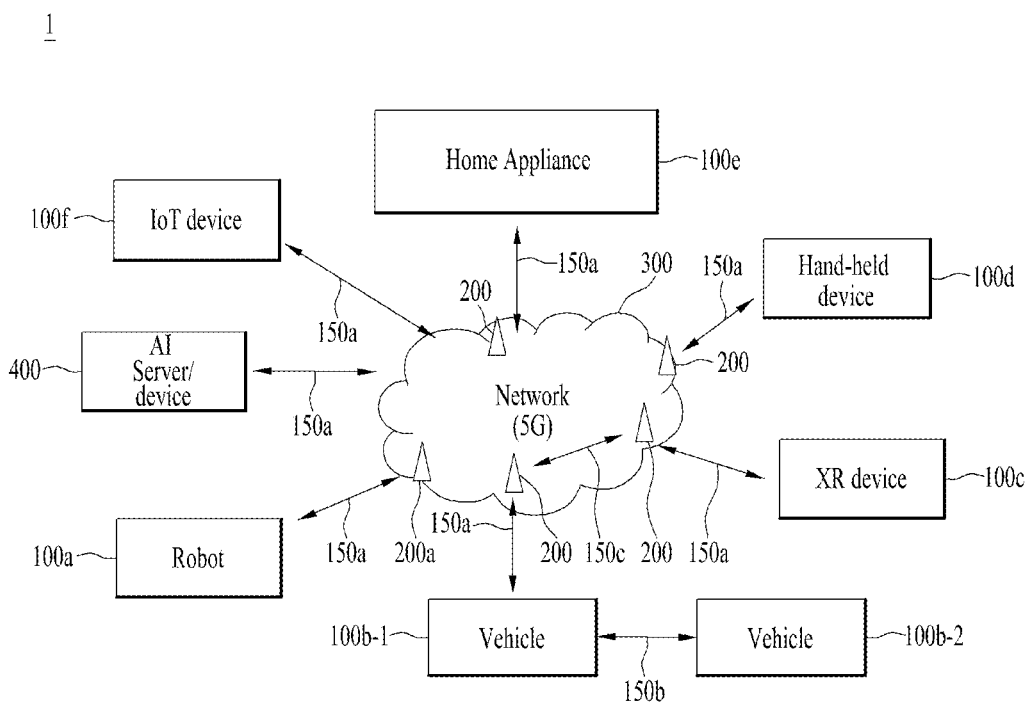
FIGS. 20 to 23 illustrate a communication system 1 and wireless devices applied to the present disclosure.

FIG. 20 illustrates a communication system 1 applied to the present disclosure.

Referring to FIG. 20, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles

100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 21:
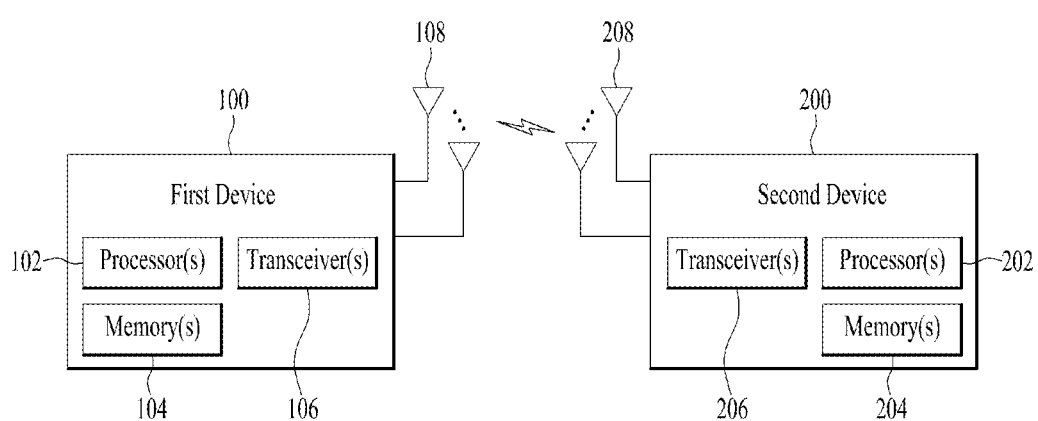

FIG. 21 illustrates wireless devices applicable to the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 22:
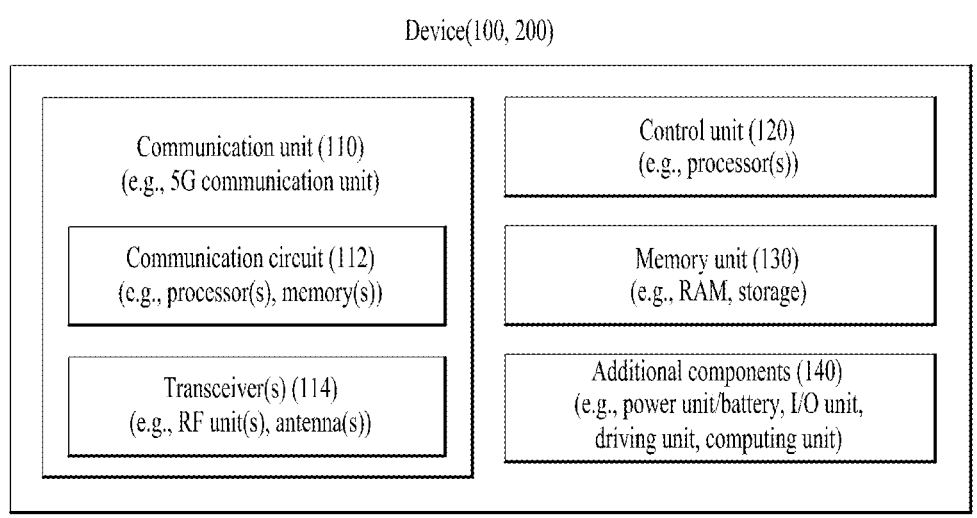

FIG. 22 illustrates another example of a wireless device applied to the present disclosure. The wireless device may be implemented in various forms according to a use-case/service (refer to FIG. 13).

Referring to FIG. 22, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100f of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 23:
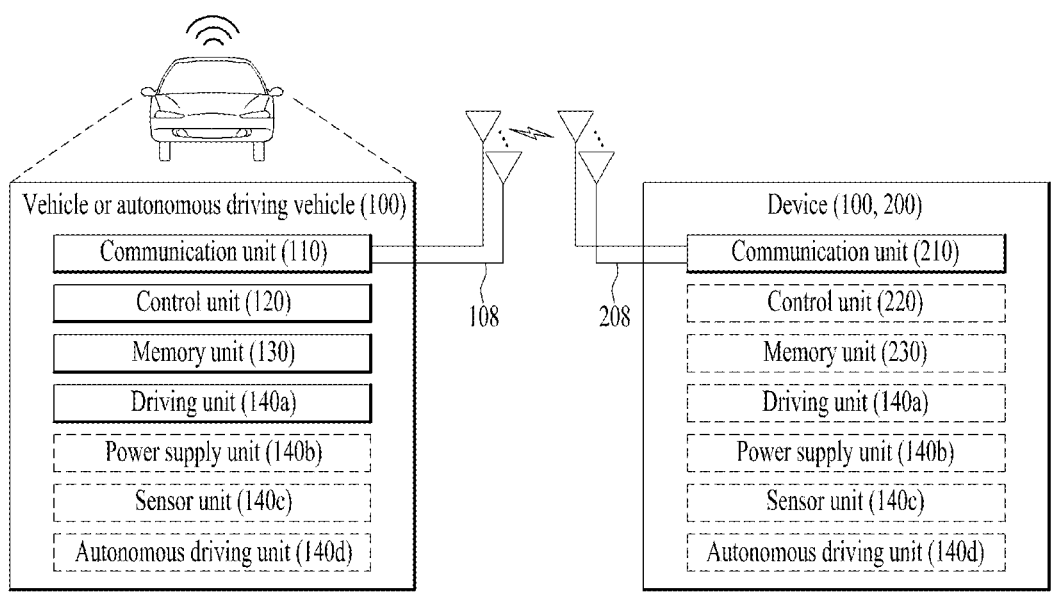

FIG. 23 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 23, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure is applicable to UEs, BS, or other devices of wireless mobile communication systems.

The invention claimed is:

1. A method of receiving a signal by a user equipment (UE) in a wireless communication system, the method comprising:
   receiving control resource set (CORESET) configuration information;
   monitoring a plurality of physical downlink control channel (PDCCH) candidates in a CORESET based on the CORESET configuration information; and
   detecting a PDCCH from among the plurality of PDCCH candidates,
   wherein each PDCCH candidate consists of one or more control channel elements (CCEs),
   wherein each CCE consists of a plurality of resource element groups (REGs),
   wherein one REG is defined by an orthogonal frequency division multiplexing (OFDM) symbol group (OSG) size corresponds to N consecutive OFDM symbols (where N>1) and M consecutive resource elements (REs) (where M>1), and
   wherein the number of REs in each REG is 'OSG size* (12/OSG size)', (OSG size >1).

2. The method of claim 1, wherein each REG includes a demodulation reference signal (DMRS) only in REs of a first OFDM symbol among the N consecutive OFDM symbols.

3. The method of claim 1, wherein each REG consists of the N consecutive OFDM symbols and 12/N consecutive REs, and
   wherein each CCE consists of 6 REGs.

4. The method of claim 1, wherein based on resource allocation information in the PDCCH, data is transmitted or received in a plurality of consecutive OFDM symbols (OSs) in a slot,
   wherein the resource allocation information comprises: (i) an integer S greater than or equal to 0 defined at an OS level; and (ii) an integer L greater than or equal to 1 defined at the OS level,
   wherein an index of a starting OS among the plurality of consecutive OSs is determined as S, and a number of the plurality of consecutive OSs is determined as N*L.

5. A user equipment (UE) in a wireless communication system, the UE comprising:
   at least one transceiver;
   at least one processor; and
   at least one computer memory operably coupled to the at least one processor and configured to, when executed, cause the at least one processor to perform operations comprising:
   receiving control resource set (CORESET) configuration information;
   monitoring a plurality of physical downlink control channel (PDCCH) candidates in a CORESET based on the CORESET configuration information; and
   detecting a PDCCH from among the plurality of PDCCH candidates,
   wherein each PDCCH candidate consists of one or more control channel elements (CCEs),
   wherein each CCE consists of a plurality of resource element groups (REGs),
   wherein one REG is defined by an orthogonal frequency division multiplexing (OFDM) symbol group (OSG) size corresponds to N consecutive orthogonal frequency division multiplexing (OFDM) symbols (where N>1) and M consecutive resource elements (REs) (where M>1), and
   wherein the number of REs in each REG is 'OSG size* (12/OSG size)', (OSG size >1).

6. The UE of claim 5, wherein each REG includes a demodulation reference signal (DMRS) only in REs of a first OFDM symbol among the N consecutive OFDM symbols.

7. The UE of claim 5, wherein each REG consists of the N consecutive OFDM symbols and 12/N consecutive REs, and
   wherein each CCE consists of 6 REGs.

8. The UE of claim 7, wherein based on resource allocation information in the PDCCH, data is transmitted or received in a plurality of consecutive OFDM symbols (OSs) in a slot,
   wherein the resource allocation information comprises: (i) an integer S greater than or equal to 0 defined at an OS level; and (ii) an integer L greater than or equal to 1 defined at the OS level,
   wherein an index of a starting OS among the plurality of consecutive OSs is determined as S, and a number of the plurality of consecutive OSs is determined as N*L.

9. An apparatus for a user equipment (UE), the apparatus comprising:
   at least one processor; and
   at least one computer memory operably coupled to the at least one processor and configured to, when executed, cause the at least one processor to perform operations comprising:
   receiving control resource set (CORESET) configuration information;
   monitoring a plurality of physical downlink control channel (PDCCH) candidates in a CORESET based on the CORESET configuration information; and
   detecting a PDCCH from among the plurality of PDCCH candidates,
   wherein each PDCCH candidate consists of one or more control channel elements (CCEs),
   wherein each CCE consists of a plurality of resource element groups (REGs),
   wherein one REG is defined by an orthogonal frequency division multiplexing (OFDM) symbol group (OSG) size corresponds to N consecutive orthogonal frequency division multiplexing (OFDM) symbols (where N>1) and M consecutive resource elements (REs) (where M>1), and
   wherein the number of REs in each REG is 'OSG size* (12/OSG size)', (OSG size >1).

10. A non-transitory computer-readable storage medium comprising at least one computer program configured to, when executed, cause at least one processor to perform operations comprising: receiving control resource set (CORESET) configuration information; monitoring a plurality of physical downlink control channel (PDCCH) candidates in a CORESET based on the CORESET configuration information; and detecting a PDCCH from among the plurality of PDCCH candidates, wherein each PDCCH candidate consists of one or more control channel elements (CCEs), wherein each CCE consists of a plurality of resource element groups (REGs), wherein one REG is defined by an orthogonal frequency division multiplexing (OFDM) symbol group (OSG) size corresponds to N consecutive orthogonal frequency division multiplexing (OFDM) symbols (where N>1) and M consecutive resource elements (REs) (where M>1), and wherein the number of REs in each REG is 'OSG size*(12/OSG size)', (OSG size >1).

11. A base station in a wireless communication system, the base station comprising:
- at least one transceiver;
- at least one processor; and
- at least one computer memory operably coupled to the at least one processor and configured to, when executed, cause the at least one processor to perform operations comprising:
- transmitting control resource set (CORESET) configuration information;
- configuring a plurality of physical downlink control channel (PDCCH) candidates in a CORESET based on the CORESET configuration information; and
- transmitting a PDCCH among the plurality of PDCCH candidates,
- wherein each PDCCH candidate consists of one or more control channel elements (CCEs),
- wherein each CCE consists of a plurality of resource element groups (REGs),
- wherein one REG is defined by an orthogonal frequency division multiplexing (OFDM) symbol group (OSG) size corresponds to N consecutive orthogonal frequency division multiplexing (OFDM) symbols (where N>1) and M consecutive resource elements (REs) (where M>1), and
- wherein the number of REs in each REG is 'OSG size*(12/OSG size)', (OSG size >1).

* * * * *